United States Patent [19]
Foflygen

[11] 3,987,992
[45] Oct. 26, 1976

[54] MOUNTING ARRANGEMENT FOR ELECTRICAL OUTLET BOXES

[75] Inventor: Ronald W. Foflygen, Leetsdale, Pa.

[73] Assignee: Midland-Ross Corporation, Cleveland, Ohio

[22] Filed: June 20, 1975

[21] Appl. No.: 588,603

[52] U.S. Cl. .......................... 248/205 R; 248/342; 248/DIG. 6
[51] Int. Cl.² ..................... H02G 3/10; H02G 3/08; F16B 2/24
[58] Field of Search .......... 248/342, 343, 57, 205 R, 248/DIG. 6; 174/58, 63; 85/80; 151/41.75

[56] References Cited
UNITED STATES PATENTS

| | | | |
|---|---|---|---|
| 2,295,333 | 9/1942 | Clark | 174/63 |
| 2,376,167 | 5/1945 | Mitchell | 85/80 |
| 2,732,162 | 1/1956 | McKinley | 248/343 |
| 2,788,188 | 4/1957 | Smith et al. | 151/41.75 X |
| 2,824,167 | 2/1958 | Bauer | 174/63 |
| 3,104,087 | 9/1963 | Budnick et al. | 248/343 |

*Primary Examiner*—J. Franklin Foss
*Attorney, Agent, or Firm*—H. Duane Switzer

[57] ABSTRACT

A mounting arrangement for electrical outlet boxes or the like includes a generally U-shaped clip having a longitudinal axis and a generally flat base extending substantially perpendicular to the axis. A fastener receiving aperture extends through the base, and opposite legs diverge outwardly from the base at included angles with the base greater than 90° and substantially less than 180°. The legs are yieldably deformable toward the longitudinal axis and have inwardly extending clamping portions adjacent the terminal ends thereof. The legs include terminal end portions extending outwardly from the clamping portions.

12 Claims, 8 Drawing Figures

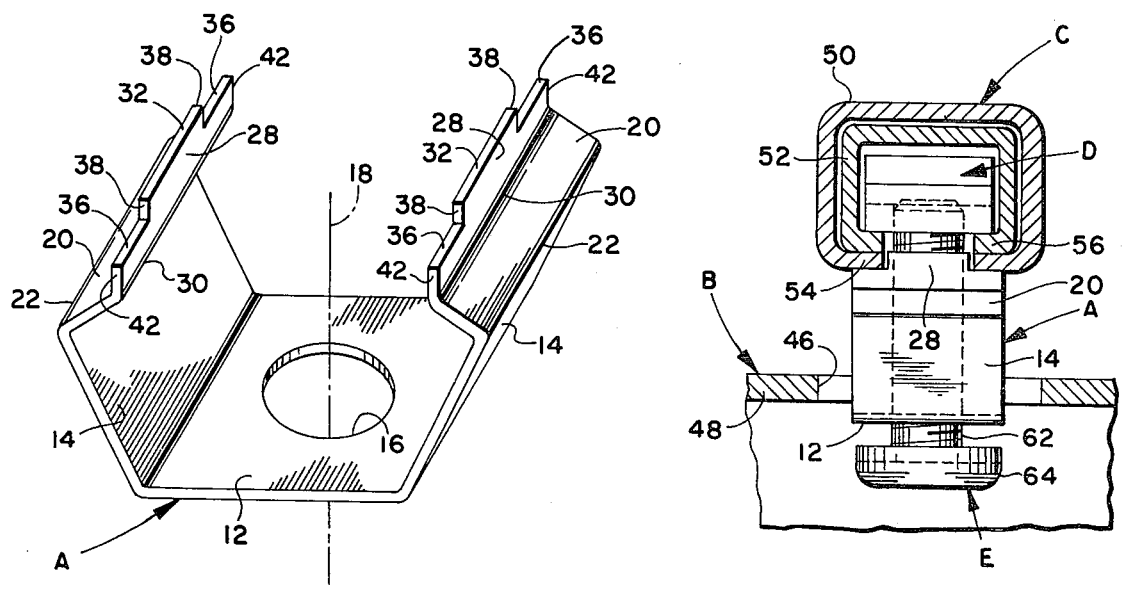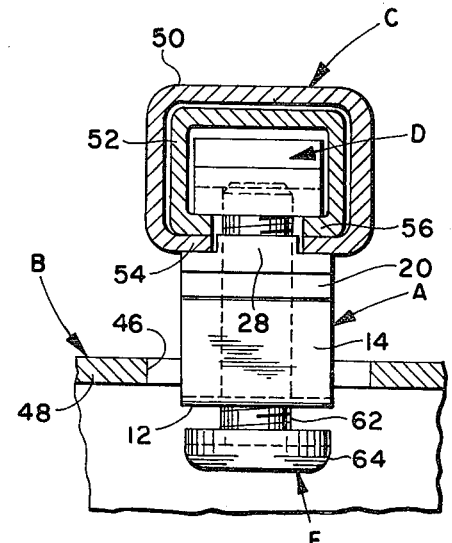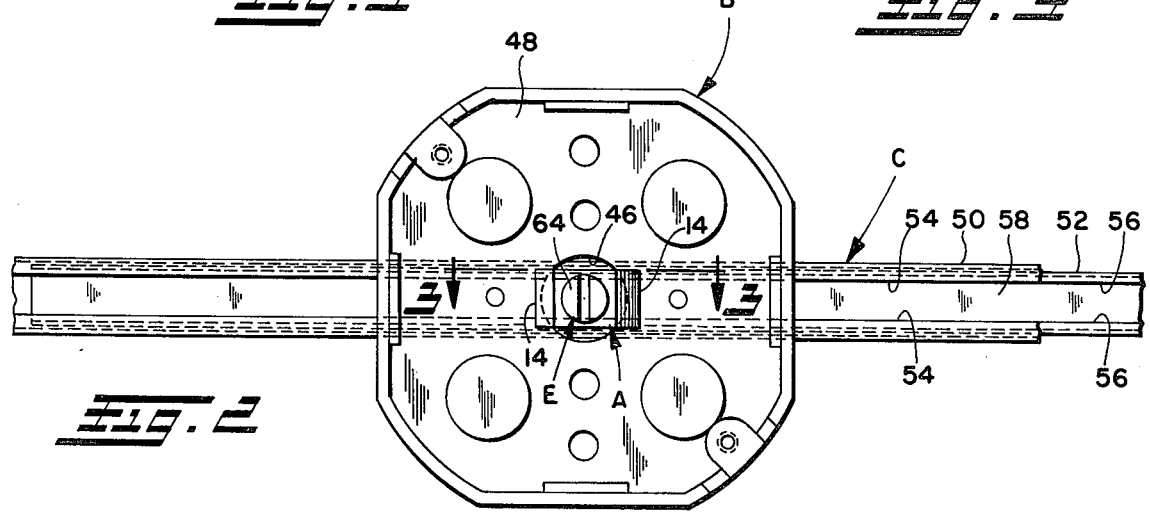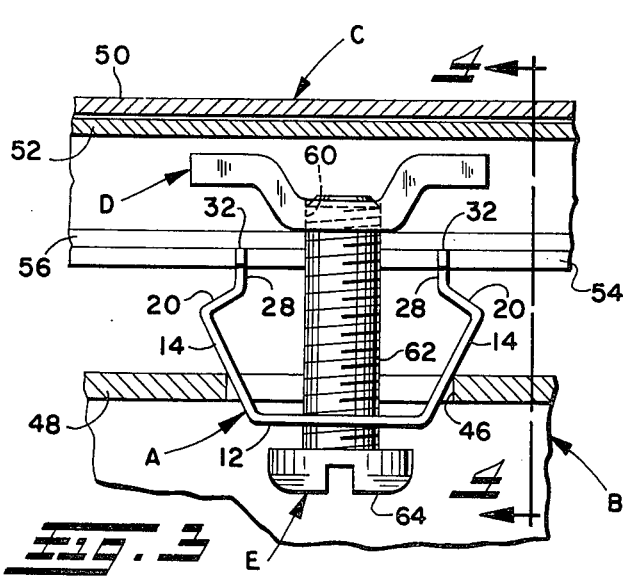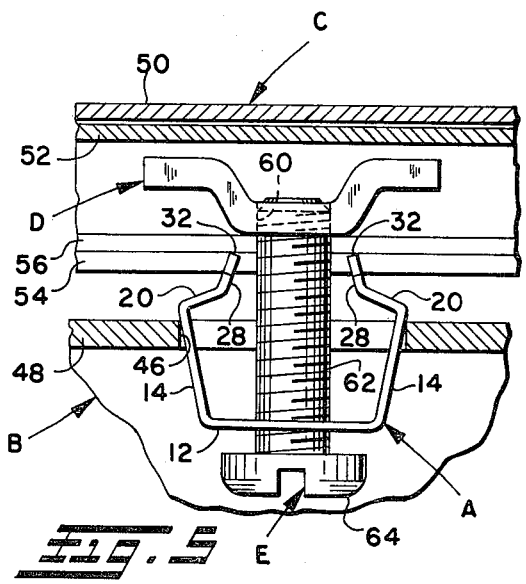

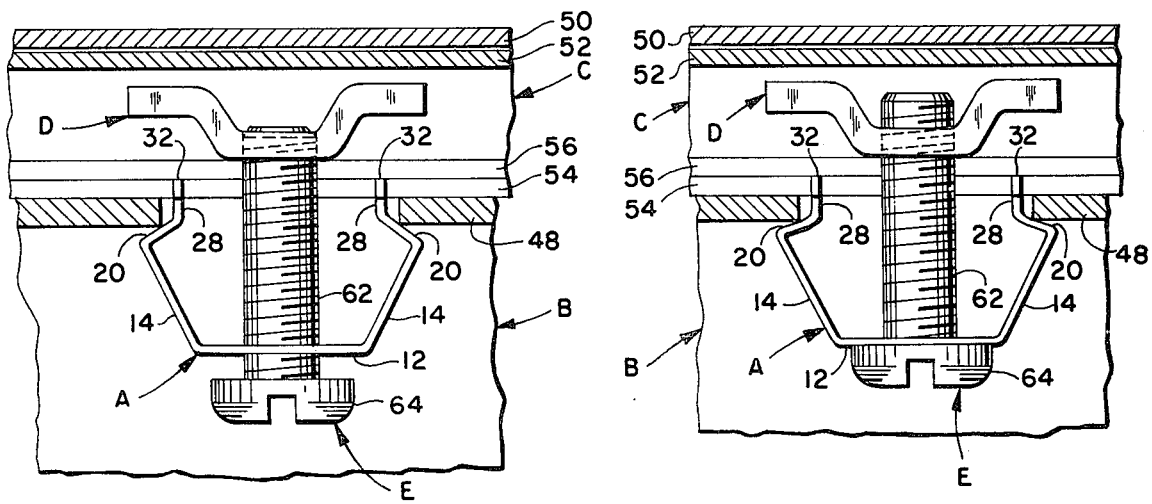
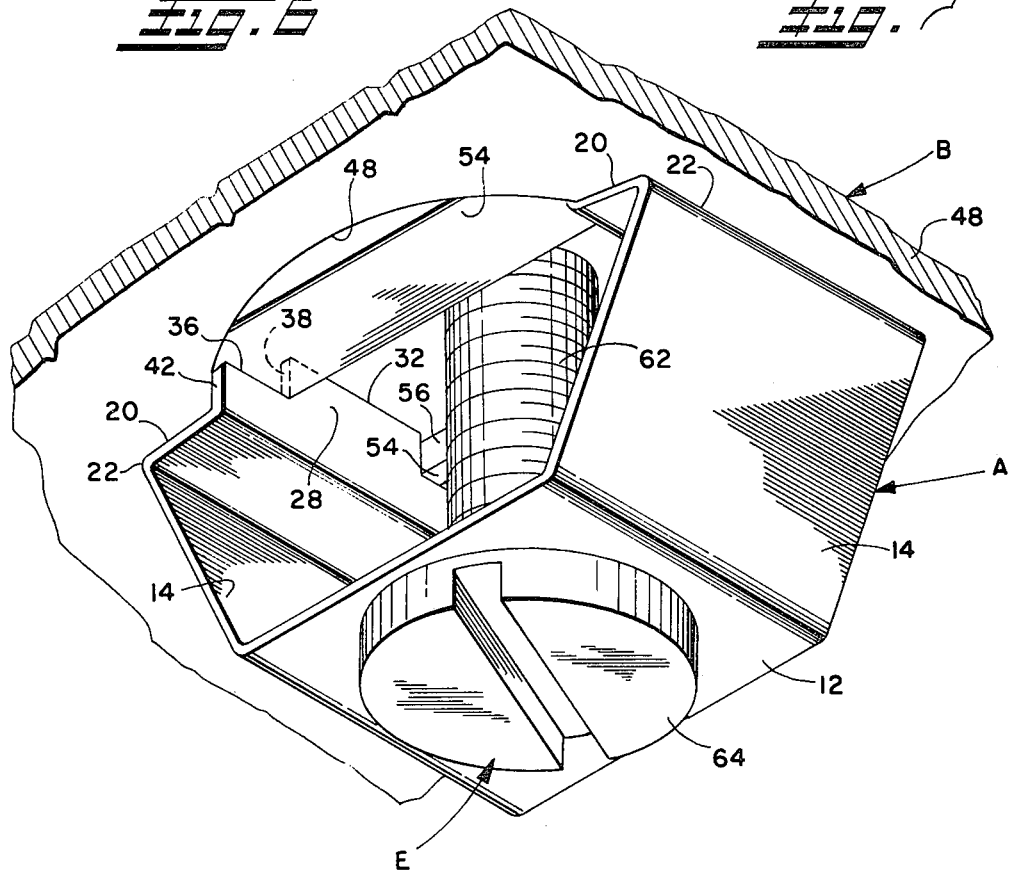

MOUNTING ARRANGEMENT FOR ELECTRICAL OUTLET BOXES

BACKGROUND OF THE INVENTION

This application pertains generally to the art of fasteners and, more particularly, to fasteners for mounting a member to a support. The invention is particularly applicable for use in mounting electrical outlet boxes to bar hangers and will be described with reference thereto. However, it will be appreciated that the invention has broader aspects and may be used for mounting other members to supports.

Electrical outlet boxes are commonly clamped to bar hangers secured between joists or studs in a building. The bar hangers normally comprise telescoped channels so that the length of the bar hanger can be adjusted to fit between studs or joists of varied spacing. The clamping device for clamping an outlet box to the bar hanger and for clamping the hanger channels against movement relative to one another is normally assembled with the bar hanger at the factory. The most popular type of clamping device is one which does not have to be disassembled from the bar hanger by a workman in order to mount the outlet box. The clamping device is simply loosened so that the outlet box can be positioned on it, and the clamping device is then tightened to securely clamp the outlet box to the bar hanger.

One clamping device of the type described is disclosed in U.S. Pat. No. 2,295,333 issued Sept. 8, 1942, to Clark, and U.S. Pat. No. 3,080,084 issued Mar. 5, 1963, to Appleton. In clamping devices of this type, the outlet box must be tilted and moved sideways in order to locate the outlet box hole between the clamp and hanger. This means that the clamp must be very loose so that a workman must rotate the screw a relatively large number of turns to loosen the clamp and then tighten it. Also in these devices, care must be taken that the periphery of the outlet box hole remains in contact with alignment shoulders on the clamp so that the box will be clamped on both sides of the hole. When mounting outlet boxes with the opening facing horizontally, the box must be held with one hand against the clamp for proper positioning while the screw is tightened.

U.S. Pat. No. 2,824,167 issued Feb. 18, 1958, to Bauer, and U.S. Pat. No. 3,104,087 issued Sept. 17, 1963, to Budnick disclose outlet box clamping devices having legs which cooperate with cammed surfaces so that the legs flare outwardly to engage the box when the screw is tightened. In these devices, the outlet box must be held in position with one hand while the screw is tightened.

U.S. Pat. No. 3,214,126 issued Oct. 26, 1965, to Roos is of general interest for another type of outlet box clamping device. It is not clear how the clamping device in Roos is assembled to the outlet box.

U.S. Pat. No. 2,732,162 issued Jan. 24, 1956, to McKinley and U.S. Pat. No. 2,963,253 issued Dec. 6, 1960, to Maier et al disclose outlet box clamping devices which include spring clips. In the McKinley and Maier devices, a hole in an outlet box is aligned with a clamping device having spring legs which bend inwardly due to engagement of the hole periphery with such legs as the box is pushed toward the bar hanger. When that portion of the outlet box having the hole therein is positioned between the bar hanger and spring legs, such legs spring outwardly and a screw is then tightened to firmly clamp the outlet box between the bar hanger and spring legs. In the McKinley device, there is nothing to space the terminal ends of the spring legs from the facing surface of the bar hanger. Therefore, when the outlet box is pushed onto the clamping device, the terminal ends of the spring legs would abut the bar hanger and make it impossible for the outlet box wall to be positioned between the bar hanger and terminal end of the spring legs. The only way the outlet box could be installed would be by pulling on the clamping device while pushing on the outlet box and this would require the use of both hands. In the Maier device, there are spacer legs which engage the bar hanger for maintaining the terminal ends of the spring legs spaced from the bar hanger a distance greater than the thickness of the outlet box wall through which the hole is formed. Such spacer legs are scored so they can be deformed by tightening of the screw. The Maier device requires considerable material because the spacer legs are completely separate from the spring legs. In addition, the shape of the Maier clamping device, and the separate spacer legs make it somewhat difficult to form the device. There are some confusing disclosures in the Maier patent but correction of most of that confusion is believed to be generally obvious. For example, beginning in line 53 of column 3, there is a description of how the clamping device is assembled. As this description proceeds on over to column 4, it is explained that the screw is firmly tightened and the tips of the spacer legs deform to securely lock the telescoped bar hanger sections together, and to securely tighten the clamping device on the bar hanger. It is then stated that the outlet box is snapped into place. However, if one attempted to mount an outlet box in this manner, it would not be possible because the generally U-shaped mounting portion of the Maier device engages the spring legs so they could not yieldably deform inwardly as the box was pushed into place. In addition, there would be insufficient space between the terminal ends of the spring legs and the bar hanger to receive the wall of the outlet box through which the hole is formed. With the shape of a spring clip as shown in FIGS. 6 and 7 of the Maier patent, and as described in the specification, it would not be possible for the terminal ends of the spring legs to snap outwardly in the manner broadly suggested. This is because detents 37 are shown extending upwardly above the terminal ends of the spring clip which engage the bottom surface of the outlet box wall through which the hole is formed. Holes in shown and boxes are circular, and with the cup-like spring clip shown and described by Maier, detents 37 would engage the periphery of the hole even if the hole were above the terminal ends of the spring clip so outward snapping of the spring legs would not occur. It is believed that detents 37 of Maier would have to be bent inwardly from the terminal ends of the spring legs.

SUMMARY OF THE INVENTION

A device for clamping an electrical outlet box or the like to a support comprises a generally U-shaped spring clip having a longitudinal axis. A generally flat base extends substantially perpendicular to the axis and has a centrally located fastener receiving aperture therethrough. Opposite legs diverge outwardly from the base at included angles with the base greater than 90° and substantially less than 180°. The legs are yieldably deformable toward the axis and have inwardly extending clamping portions adjacent the terminal end portions thereof. Spacer means on the legs themselves spaces the clamping portions from the support while the legs are deformed inwardly so that the clamping portions can snap outwardly beneath the wall of the outlet box through which a hole is formed.

In one arrangement, the clip is used with channel-shaped bar hangers and such channels have flanges extending toward one another on opposite sides of a longitudinal slot. The clip includes notches in its terminal end portions to define an extended end which fits in the channel slots for holding the clip against rotation.

The bottom edges of the notches engage the outer surfaces of the channel flanges to space the clamping portions of the clip outwardly from the channel flanges. Tightening of the fastener means deforms the clamping portions into firm engagement with the wall of the outlet box through which the hole is formed.

It is a principal object of the present invention to provide an economical device for mounting electrical outlet boxes or the like.

It is a further object of the invention to provide an outlet box mounting device which saves considerable time of a workman installing such boxes.

It is an additional object of the invention to provide an outlet box mounting device which is very sturdy and firmly supports an outlet box in a desired adjusted position on a bar hanger.

BRIEF DESCRIPTION OF THE DRAWING

FIG. 1 is a perspective illustration of a clip made in accordance with the present invention;

FIG. 2 is a bottom view of an outlet box mounted on a bar hanger with the improved clamping device of the present invention;

FIG. 3 is a partial cross-sectional elevational view taken generally on line 3—3 of FIG. 2, and showing the outlet box in a position just ready to be installed;

FIG. 4 is a partial cross-sectional elevational view taken generally on line 4—4 of FIG. 3;

FIG. 5 is a partial view similar to FIG. 3 showing the outlet box in an intermediate position during installation thereof;

FIG. 6 is a view similar to FIGS. 3 and 5, and showing the outlet box after it has reached its desired mounting position;

FIG. 7 is a view similar to FIGS. 3, 5 and 6, and showing the outlet box completely installed after tightening of a screw; and FIG. 8 is a fragmentary perspective illustration showing an electrical outlet box mounted with the clamping device of the present invention.

DESCRIPTION OF A PREFERRED EMBODIMENT

With reference to the drawing, FIG. 1 shows a generally U-shaped spring clip A which is preferably made of spring metal, although other materials can be used depending upon the strength requirements. Clip A includes a substantially flat base 12 having opposite plane legs 14 diverging upwardly therefrom. Legs 14 intersect base 12 at included angles greater than 90° and substantially less than 180°. In one preferred form, such included angles are approximately 116°.

Base 12 has a centrally located fastener receiving aperture 16 therethrough, and such aperture has a longitudinal axis 18 which also defines the longitudinal axis of clip A.

Each leg 14 includes an inwardly extending clamping portion 20 spaced a substantial distance from base 12 and bent inwardly along bends 22. Clamping portions 20 extend approximately or substantially perpendicular to the main portions of legs 14. In one arrangement, clamping portions 20 intersect the main portions of legs 14 at included angles of approximately 94°.

Legs 14 have terminal end portions 28 extending upwardly from clamping portions 20 and intersect such clamping portions along bends 30. In a preferred arrangement, plane terminal end portions 28 extend approximately or substantially parallel to longitudinal axis 18 and have terminal ends 32 of a width substantially less than the width of legs 14. Terminal end portions 28 have opposite notches formed therein to define notch bottom edges 36 and notch side edges 38. Those parts of terminal end portions 28 between notch bottom edges 36 and bends 30 define spacer means for spacing clamping portions 20 and bends 22 from a support in a manner which will be explained as the description proceeds. Those parts of terminal end portions 28 between notch bottoms 36 and terminal ends 32, and between notch side edges 38, define extended terminal end portions for preventing rotation of clip A in a manner which will be explained as the description proceeds. Terminal end portions 28 have opposite edges 42 which are located generally on the periphery of a circle or cylinder having generally the same diameter as a hole in a member which is clamped to a support by clip A.

With reference to FIG. 2, a conventional metal electrical outlet box B has a plurality of circular knockouts, one of which has been removed to provide a central circular hole 46 through outlet box wall 48.

A bar hanger C includes an outer channel 50 telescopically receiving an inner channel 52 so that the length of bar hanger C can be adjusted. Outer channel 50 has inwardly extending flanges 54, while inner channel 52 has inwardly extending flanges 56, and a longitudinal slot 58 is defined in bar hanger C between such flanges. Obviously, the sizes of channels 50 and 52 are such that they closely fit relative to one another, and the edges of flanges 54 and 56 are substantially aligned. Bar hanger C has suitable securing devices at its ends for securing same between a pair of joists or studs, so that slot 58 faces either downwardly or generally horizontally. Obviously, slot 58 can also face upwardly or at various angles to the vertical or horizontal if so desired.

A nut member D is slidably received within inner channel 52 and has a width so that it bears against the inner surfaces of flanges 56. A threaded hole 60 in nut member D threadably receives threaded shank 62 on screw E having an enlarged head 64. Screw E defines a fastener, and aperture 16 in base 12 of clip A has a diameter such that shank 62 freely extends therethrough without threading.

Nut D, clip A and fastener E may be assembled to bar hanger C in any desirable manner. Inner and outer channels 52 and 50 may be axially separated so that nut D can be inserted into the end of inner channel 52. The inner and outer channels may then again be telescoped. Shank 62 of fastener E may then be extended through aperture 16 in base 12 of clip A and fastener E screwed into threaded hole 60 in nut D. Clip A, nut D and fastener E may also be assembled separately from bar hanger C and the channels then separated so that nut D can be slid into the end of inner channel 52. It is also possible to use a nut which can be inserted through slot 58, and fastener E having clip A thereon is then threaded into the nut. When the device is shipped from the factory, fastener E is normally tightened so that notch bottom edges 36 bear against the outer surfaces of flanges 54, while nut D bears against the inner surfaces of flanges 56 so that inner and outer channels 52 and 50 are clamped against axial movement during shipping, storing and handling. When a workman installs the device, fastener E is simply loosened so that inner and outer channels 52 and 50 can be axially adjusted to fit between joists or studs, and are then secured thereto. Outlet box B or the like is then positioned with hole 46 therein aligned with clip A as shown in FIG. 3. Force applied to box B for moving same toward bar hanger C will deform legs 14 inwardly as shown in FIG. 5 until opening 46 passes clip bends 22 whereupon legs 14 again spring outwardly as shown in FIG. 6. Fastener E is then tightened for securely clamping outlet box wall 48 between the outer surfaces of flanges 54 and clamping portions 20 of clip A.

In the preferred arrangement, clip end portions 28 between notch bottom edges 36 and bends 30 have a height parallel to axis 18 which is slightly less than the thickness of wall 48 around opening 46. In one arrangement, this height of those defined portions of end portions 28 is approximately 0.060 inches, while the thickness of wall 48 around opening 46 is approximately 0.0747 inches. However, the distance parallel to axis 18 from notch bottom edges 36 to bends 22 is substantially greater than the thickness of wall 48 around opening 46. Clip A is made of relatively thin spring steel so that clamping portions 20 are deformable toward base portion 12 when fastener E is securely tightened.

During assembly of outlet box B to clip A as shown in FIGS. 3–6, notch bottom edges 36 engage the outer surfaces of flanges 54 on outer channel 50 to define spacer means for maintaining bends 22 spaced outwardly from the outer surfaces of flanges 54 a distance greater than the thickness of wall 48 in order that legs 14 of clip A can snap outwardly to the position shown in FIG. 6 once wall 48 clears clip bends 22. Clip end portions 28 and opposite side edges 42 thereof also prevent lateral displacement of wall 48 relative to clip A to insure that wall 48 will be clamped on opposite sides of opening 46 instead of on only one side thereof. Extended end portions of clip end portions 28 from notch bottom edges 36 to terminal ends 32 extend into slot 58 between the edges of flanges 54 during tightening of fastener E for preventing rotation of clip A to insure that clamping portions 20 act directly on that portion of wall 48 positioned between channel flanges 54 and clamping portions 20. In the relaxed condition of clip A, side edges 42 of end portions 28 are located on the periphery of a circle having a diameter generally the same or slightly less than the diameter of opening 46 in outlet box wall 48.

Before fastener E is tightened, outlet box B, along with nut D, clip A and fastener E, may be slid relative to channel 52 for locating outlet box B in a desired position between the joists or studs. With the mounting device of the present application, it is found that it is necessary to loosen screw E approximately only one turn in order to assemble outlet box B in the manner shown in FIGS. 3–6. Screw E is then tightened for securely clamping outlet box B to bar hanger C, and securely clamping outer and inner channels 50 and 52 against axial movement. The arrangement shown and described makes it possible to mount outlet box B with its opening facing in any desired direction, and it is not necessary to hold the box with one hand while screw E is tightened because clamping portions 20 and end portions 28 of clip A hold the box in its desired position once it has been assembled as shown in FIG. 6.

Obviously, the corners of base portion 12 on clip A lie on the periphery of a circle having a smaller diameter than opening 46, while the outer corners at the intersection between the main portions of legs 14 and clamping portions 20 lie on the periphery of a circle having a diameter substantially greater than the diameter of opening 46. In fact, it is preferred that the diameter of opening 46 is such that a circle drawn about axis 18 of FIG. 1 lies completely within the bends defined by lines 22. The improved mounting device of the present application is very simple to manufacture because all of the surfaces of clip A are plane so that forming thereof is very simple.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A device for clamping an electrical outlet box or the like to a support, comprising; a generally U-shaped clip having a longitudinal axis, a generally flat base extending substantially perpendicular to said axis and having a substantially centrally located fastener receiving aperture therethrough, opposite legs diverging outwardly from said base at included angles with said base greater than 90° and substantially less than 180° and being yieldably deformable toward said axis, said legs having inwardly extending clamping portions adjacent the terminal end portions thereof, and spacer means extending outwardly from said clamping portions for spacing said clamping portions from a support when said legs are deformed toward said axis.

2. The device of claim 1 wherein said legs have terminal end portions extending outwardly from said clamping portions and terminating at terminal ends, said terminal end portions having opposite notches therein and including notch bottoms and notch sides, and said spacer means being defined by said terminal end portions between said notch bottoms and said clamping portions.

3. The device of claim 2 wherein said terminal end portions of said legs extend generally parallel to said longitudinal axis.

4. The device of claim 3 wherein said clamping portions extend generally perpendicular to said legs.

5. The device of claim 2 wherein said notches extend from said terminal ends toward said clamping portions over a distance substantially less than the entire distance between said terminal ends and said clamping portions.

6. The device of claim 1 wherein said clamping portions are yieldably deformable toward said base.

7. A mounting arrangement for clamping a member to a support, said member having a wall with a hole therethrough and a predetermined wall thickness around said hole, a generally U-shaped clip having a longitudinal axis, a base extending generally perpendicular to said axis and having a fastener receiving aperture therethrough, opposite legs diverging outwardly from said base at included angles with said base greater than 90° and substantially less than 180° and being yieldably deformable toward said axis, said legs having inwardly extending clamping portions spaced outwardly from said base and intersecting said legs at corners, spacer means on said legs outwardly of said clamping portions for maintaining said corners spaced from said support a distance not less than said predetermined wall thickness during deformation of said legs toward said axis, said clip being positioned with said spacer means located adjacent said support and said base located in outwardly-spaced relationship to said support, and fastener means extending through said aperture and being adjustably secured to said support for selectively moving said clip toward or away from said support, whereby when said fastener is loose said member is positionable with said hole therein aligned with said clip and force applied to said member for moving same toward said support causes inward deformation of said legs by engagement with the periphery of said hole until said wall passes said corners and said legs spring outwardly to trap said wall around the periphery of said hole between said support and said clamping portions so that tightening of said fastener firmly clamps said member against said support.

8. The mounting arrangement of claim 7 wherein said support comprises a channel having a longitudinal slot between opposed flanges extending toward one another, said clip legs having terminal end portions received in said slot, said spacer means being located between said terminal end portions and said clamping portions for engaging the outer surfaces of said flanges on opposite sides of said slot.

9. The mounting arrangement of claim 7 wherein said clamping portions are yieldably deformable toward said base upon tightening of said fastener.

10. In combination; a support having an outer support surface, an electrical outlet box or the like having a hole therein of a predetermined diameter, a generally U-shaped clip having a longitudinal axis and a generally flat base extending substantially perpendicular to said axis, a substantially centrally located fastener receiving aperture through said base receiving a fastener which is adjustably secured to said support, opposite legs diverging outwardly from said base at included angles with said base greater than 90° and substantially less than 180° and being yieldably deformable toward said axis, said legs having inwardly extending clamping portions adjacent the terminal end portions thereof, said box being positioned with the peripheral portion thereof around said hole lying between said support and said clamping portions, spacer means extending outwardly from said clamping portions for spacing said clamping portions from a support when said legs are deformed toward said axis, and said legs of said clip including terminal end portions having opposite edges lying generally on the circumference of a circle having a diameter generally the same as said predetermined diameter of said hole in said box.

11. The device of claim 10 wherein said peripheral portion of said box around said hole has a thickness greater than the length of said terminal end portions.

12. The device of claim 10 wherein said support comprises at least one channel member having a slot therein and said terminal end portions of said clip have opposite notches therein to define leg terminal ends having a width less than the width of said legs, said leg terminal ends being received in said slot, and said terminal end portions between said clamping portions and said notches having a length parallel to said axis which is less than the thickness of said box around the peripheral portion of said hole.

* * * * *